(12) United States Patent
Yuan et al.

(10) Patent No.: US 11,113,874 B2
(45) Date of Patent: Sep. 7, 2021

(54) DISPLAYING RICH TEXT ON 3D MODELS

(71) Applicant: Advanced New Technologies Co., Ltd., George Town (KY)

(72) Inventors: Feihu Yuan, Hangzhou (CN); Xin Fu, Hangzhou (CN); Jing Zhan, Hangzhou (CN); Huan Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/035,374

(22) Filed: Sep. 28, 2020

(65) Prior Publication Data

US 2021/0012565 A1    Jan. 14, 2021

Related U.S. Application Data

(63) Continuation of application No. 16/888,513, filed on May 29, 2020, now Pat. No. 10,789,770, which is a
(Continued)

(30) Foreign Application Priority Data

May 31, 2018    (CN) .......................... 201810556568.X

(51) Int. Cl.
*G06T 17/00*    (2006.01)
*G06F 40/00*    (2020.01)
*G06T 15/04*    (2011.01)
*G06F 40/106*   (2020.01)
*G06F 8/34*     (2018.01)
*G06T 19/00*    (2011.01)

(52) U.S. Cl.
CPC ................ *G06T 17/00* (2013.01); *G06F 8/34* (2013.01); *G06F 40/00* (2020.01); *G06F 40/106* (2020.01); *G06T 15/04* (2013.01); *G06T 19/006* (2013.01)

(58) Field of Classification Search
CPC .......... G06T 17/00; G06T 15/04; G06F 40/00
See application file for complete search history.

(56) References Cited

U.S. PATENT DOCUMENTS

| 5,805,783 A | 9/1998 | Ellson et al. |
| 9,076,244 B2 | 7/2015 | Bacus et al. |

(Continued)

FOREIGN PATENT DOCUMENTS

| CN | 101340598 | 1/2009 |
| CN | 102867322 | 1/2013 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Matthew Salvucci
(74) *Attorney, Agent, or Firm* — Fish & Richardson P.C.

(57) ABSTRACT

A computer-implemented method for displaying rich text on a 3D model includes obtaining, by one or more processing devices, a target rich text; invoking a rendering tool corresponding to a file format of the target rich text; rendering the target rich text using the rendering tool, to obtain a rendering result; invoking a graphical programming interface; and texture mapping the rendering result to an area of the 3D model using the graphical programming interface.

17 Claims, 3 Drawing Sheets

Related U.S. Application Data continuation of application No. PCT/CN2019/077436, filed on Mar. 8, 2019.

(56) References Cited

U.S. PATENT DOCUMENTS

| | | |
|---|---|---|
| 9,846,682 B1 | 12/2017 | Righetto et al. |
| 2007/0171222 A1 | 7/2007 | Kowalski |
| 2010/0045662 A1 | 2/2010 | Boathroyd et al. |
| 2013/0002647 A1 | 1/2013 | Bacus et al. |
| 2019/0005717 A1 | 1/2019 | Singh et al. |

FOREIGN PATENT DOCUMENTS

| | | |
|---|---|---|
| CN | 103279559 | 9/2013 |
| CN | 103777989 | 5/2014 |
| CN | 107368655 | 11/2017 |
| CN | 107679188 | 2/2018 |
| CN | 107707965 | 2/2018 |
| CN | 107832108 | 3/2018 |
| CN | 108959392 | 12/2018 |
| TW | 201019265 | 5/2010 |
| TW | 201439973 | 10/2014 |

OTHER PUBLICATIONS

McCauley, "A browser-based event display for the CMS Experiment at the LHC using WebGL," Journal of Physics: Conference Series, Dec. 2017, 898(7):1-8.

Nakamoto, "Bitcoin: A Peer-to-Peer Electronic Cash System," www.bitcoin.org, 2005, 9 pages.

PCT International Search Report and Written Opinion in International Application No. PCT/CN2019/077436, dated Jun. 4, 2019, 10 pages (with partial English translation).

PCT International Preliminary Report on Patentability in International Application No. PCT/CN2019/077436, dated Dec. 1, 2020, 9 pages (with English translation).

Extended European Search Report in European Application No. 19810569.4, dated Jun. 7, 2021, 7 pages.

DISPLAYING RICH TEXT ON 3D MODELS

CROSS-REFERENCE TO RELATED APPLICATIONS

This application is a continuation of and claims the benefit of priority of U.S. patent application Ser. No. 16/888,513, filed May 29, 2020, which is a continuation of PCT Application No. PCT/CN2019/077436, filed on Mar. 8, 2019, which claims priority to Chinese Patent Application No. 201810556568.X, filed on May 31, 2018, and each application is hereby incorporated by reference in their entirety.

TECHNICAL FIELD

The present specification relates to the field of 3D models, and in particular, to methods, apparatuses, and devices for displaying a rich text on a 3D model.

BACKGROUND 3D models can be three-dimensional polygonal representations of objects, and can be displayed by using computers or other video devices. 3D models can be widely applied to a variety of fields, for example, used to prepare accurate models of organs in the medical industry, applied to animated figures and objects and augmented reality movies in the movie industry, and used as resources in computer and electronic games in the electronic game industry. Different application scenarios may involve needs for displaying texts on 3D models.

SUMMARY

To alleviate problems in related technologies, the present specification provides methods, apparatuses, and devices for displaying a rich text on a 3D model.

According to a first aspect of the implementations of the present specification, a method for displaying a rich text on a 3D model is provided, where the method includes the following: obtaining a target rich text; invoking a rendering tool corresponding to a file format of the target rich text, and rendering the target rich text to obtain a result page; and invoking a graphical programming interface to display the result page in a to-be-displayed area of a 3D model by using a texture mapping method.

Optionally, the file format of the target rich text is a file format renderable by an existing rendering tool in an operating system.

Optionally, the invoking a graphical programming interface to display the result page in a to-be-displayed area of a 3D model by using a texture mapping method includes converting the result page into a picture; and invoking the graphical programming interface to obtain a texture of the to-be-displayed area of the 3D model, drawing the picture to the texture to obtain a texture image, and mapping the texture image to the to-be-displayed area of the 3D model.

Optionally, the target rich text includes any one of the following: a pre-stored rich text used for display in the to-be-displayed area of the 3D model; a rich text obtained by filling in a predetermined rich text template based on user information, where the rich text template is a predetermined template related to the 3D model; and a rich text related to the 3D model and obtained based on a user configuration instruction.

Optionally, the file format of the rich text is HTML, the rendering tool is an API of WebView, and the result page is a web page.

Optionally, the 3D model is a virtual model in an AR scenario.

According to a second aspect of the implementations of the present specification, an apparatus for displaying a rich text on a 3D model is provided, where the apparatus includes the following: a text acquisition module, configured to obtain a target rich text; a text rendering module, configured to invoke a rendering tool corresponding to a file format of the target rich text, and render the target rich text to obtain a result page; and an information display module, configured to invoke a graphical programming interface to display the result page in a to-be-displayed area of a 3D model by using a texture mapping method.

Optionally, the file format of the target rich text is a file format renderable by an existing rendering tool in an operating system.

Optionally, the information display module is specifically configured to convert the result page into a picture; and invoke the graphical programming interface to obtain a texture of the to-be-displayed area of the 3D model, draw the picture to the texture to obtain a texture image, and map the texture image to the to-be-displayed area of the 3D model.

Optionally, the target rich text includes any one of the following: a pre-stored rich text used for display in the to-be-displayed area of the 3D model; a rich text obtained by filling in a predetermined rich text template based on user information, where the rich text template is a predetermined template related to the 3D model; and a rich text related to the 3D model and obtained based on a user configuration instruction.

Optionally, the file format of the rich text is HTML, the rendering tool is an API of WebView, and the result page is a web page.

According to a third aspect of the implementations of the present specification, a computer device is provided, including: a processor; and a memory, configured to store an instruction executable by the processor, where the processor is configured to obtain a target rich text; invoke a rendering tool corresponding to a file format of the target rich text, and render the target rich text to obtain a result page; and invoke a graphical programming interface to display the result page in a to-be-displayed area of a 3D model by using a texture mapping method.

Technical solutions provided in the implementations of the present specification can include the following beneficial effects:

According to the implementations of the present specification, a target rich text is obtained; a rendering tool corresponding to a file format of the target rich text is invoked, and the target rich text is rendered to obtain a result page; and a graphical programming interface is invoked to display the result page in a to-be-displayed area of a 3D model by using a texture mapping method. As such, a rich text can be rendered by using an API in a terminal device, and the rich text can be displayed on a 3D model.

It should be understood that, the general description above and detailed description below are explanatory and are merely examples, and constitute no limitation on the present specification.

BRIEF DESCRIPTION OF DRAWINGS

Accompanying drawings included in the present specification and constructing a part of the present specification show implementations compliant with the present specification, and explain principles of the present specification jointly with the present specification.

DESCRIPTION OF IMPLEMENTATIONS

Figure 1:
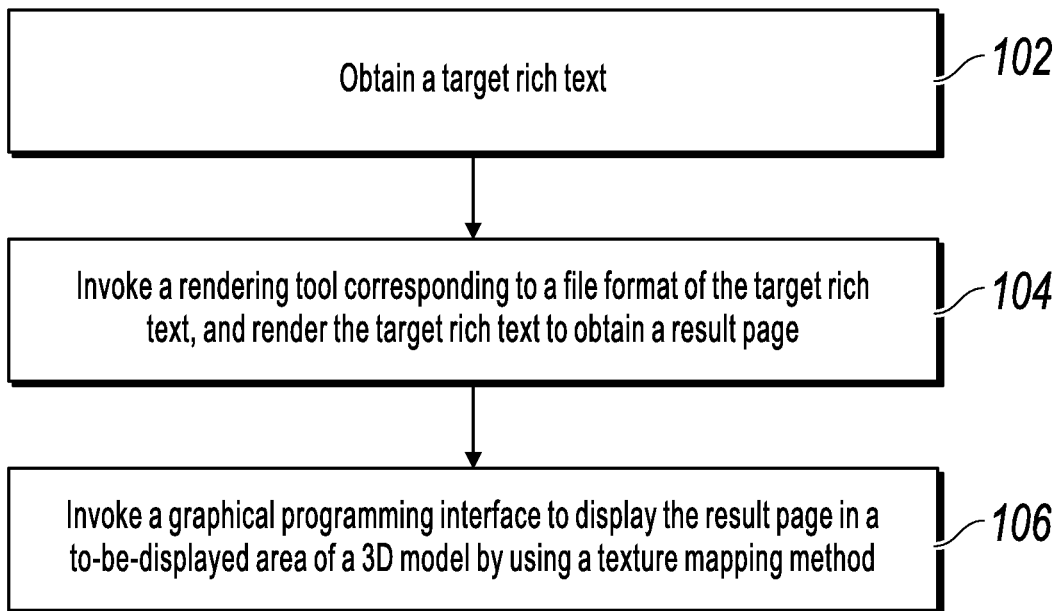
FIG. 1 is a flowchart illustrating a method for displaying a rich text on a 3D model, according to an example implementation of the present specification.

Example implementations are described in detail here, and examples of the example implementations are presented in the accompanying drawings. When the following description relates to the accompanying drawings, unless specified otherwise, same numbers in different accompanying drawings represent same or similar elements. Implementation methods described in the following example implementations do not represent all implementation methods consistent with the present specification. Instead, they are merely examples of apparatuses and methods consistent with some aspects of the present specification as set forth in the appended claims.

The terms used in the present specification are merely for illustrating specific implementations, and are not intended to limit the present specification. The terms "a", "the", and "said" of singular forms used in the present specification and the appended claims are also intended to include plural forms, unless otherwise specified in the context clearly. It should also be understood that, the term "and/or" used here indicates and includes any or all possible combinations of one or more associated listed items.

It should be understood that, although terms such as "first", "second", and "third" are used in the present specification to describe various information, the information is not limited by these terms. These terms are only used to differentiate between information of the same type. For example, without departing from the scope of the present specification, first information can also be referred to as second information, and similarly, second information can also be referred to as first information. Depending on the context, for example, the word "if" used here can be explained as "while", "when", or "in response to determining".

A rich text can be understood as a formatted text, for example, a rich text can include a word with an attribute (for example, a font or a color), a link, an embedded image, a chart, a video, etc. It can be determined that a rich text can implement a picture and text combination. A plain text can be understood as an unformatted text. Currently, a three-dimensional engine can be used to display a plain text on a 3D model, but it is difficult to use a three-dimensional engine to display a rich text on a 3D model. However, many 3D scenarios have needs for displaying rich texts on 3D models.

In view of this, the implementations of the present specification provide solutions for displaying a rich text on a 3D model, so that rendering of a rich text can be transferred from a 3D engine layer to an Application Programming Interface (API) layer of a terminal device. Because the terminal device provides abundant APIs, for a rich text that is difficult to achieve an original nature or that is difficult to dynamically generate on a 3D model, desired data can be first rendered by using an existing API of the terminal device, and then a rendering result can be rendered to a 3D model in the implementations of the present specification. As such, the 3D model and an existing control of the terminal device can be well-integrated, and the rich text can be displayed on the 3D model without increasing load of a 3D engine.

The following describes the implementations of the present specification by using examples with reference to accompanying drawings.

As shown in FIG. 1, FIG. 1 is a flowchart illustrating a method for displaying a rich text on a 3D model, according to an example implementation of the present specification. The method includes the following:

In step 102, a target rich text is obtained.

In step 104, a rendering tool corresponding to a file format of the target rich text is invoked, and the target rich text is rendered to obtain a result page.

In step 106, a graphical programming interface is invoked to display the result page in a to-be-displayed area of a 3D model by using a texture mapping method.

In the implementations of the present specification, the method can be applied to an intelligent terminal device, and in particular, to an application program that has a 3D model display function in the intelligent terminal device. The intelligent terminal device can be a variety of electronic devices that can run application programs. The electronic devices can be cellular phones, media players, or other portable devices, or can be slightly smaller portable devices such as wristwatch devices or pendant devices, or miniature devices, game devices, tablet computers, notebook computers, desktop computers, computers integrated into computer displays, or other electronic devices.

The target rich text can be a rich text to be displayed in the to-be-displayed area of the 3D model. The rich text can be understood as a formatted text, for example, the rich text can include a word with an attribute, a link, an embedded image, a chart, etc. The following describes several ways of obtaining the target rich text.

In an implementation, the target rich text can be a pre-stored rich text used for display in the to-be-displayed area of the 3D model. In the implementation, the rich text used for display in the to-be-displayed area of the 3D model can be pre-stored. For example, a mapping relationship between the to-be-displayed area of the 3D model and the rich text can be pre-stored, and the target rich text can be obtained based on the mapping relationship. The pre-stored rich text can be preconfigured by a designer who designs the 3D model, or can be preconfigured by a user who uses the 3D model, which is not limited here.

It can be determined that in the implementation, the target rich text is a pre-stored rich text. Such practice can improve efficiency of obtaining the target rich text.

In actual applications, a uniform target rich text has no personalized feature, and may be less attractive for users. Therefore, in another implementation, the target rich text can be a rich text obtained by filling in a predetermined rich text template based on user information, where the rich text template is a predetermined template related to the 3D model; and. The so-called relation can be that there is a mapping relationship between the rich text template and the 3D model. Rich text templates corresponding to different 3D models can be the same or different. Rich text templates can be correspondingly specified for different to-be-displayed areas of the same 3D model. Types and attributes of data to be filled in, a layout, etc. can be configured in the rich text template. The user information can be user information obtained based on login information of the previous application program. Data to be filled in the rich text template can be determined based on the obtained user information, and the data to be filled in is filled in the rich text template to obtain the target rich text. For example, the rich text template includes two types: a user nickname and a user profile picture, and defines attributes of the user nickname and the user profile picture. When the user information is obtained, a user nickname "FlyinDance" and a user profile picture can be extracted from the user information, and the obtained data to be filled in is filled into the rich text template based on a corresponding attribute to obtain the target rich text.

It can be determined that, in the implementation, different target rich texts can be dynamically generated for different users by using the rich text template method, so that the target rich text has a personalized feature.

In actual applications, the types and attributes of data to be filled in, the layout, etc. in the rich text template are all fixed, and may not satisfy needs of some users. Therefore, in another implementation, the target rich text can further include a rich text related to the 3D model and obtained based on a user configuration instruction.

In the implementation, a configuration interface can be provided for a user to configure a target rich text, and based on a user configuration instruction, a rich text related to the 3D model can be obtained, thereby implementing editability of the target rich text.

It should be understood that the previous target rich text obtaining methods are merely examples, and should not be construed as any limitation of the present specification. Other existing or future target rich text obtaining methods can be applied to the present specification, and shall be included in the protection scope of the present specification.

The file format of the target rich text can be a format renderable by an existing rendering tool in the terminal device. Correspondingly, the invoked rendering tool can be an existing rendering tool in the terminal device.

In an example with the intelligent terminal device being a PC, the invoked rendering tool can be an existing rendering tool in a system, or can be a rendering tool provided by a third-party application. For example, if the terminal device includes a rendering tool that can render a doc. file, and the file format of the target rich text can be a doc. format. For another example, if the terminal device includes a rendering tool that can render a WPS file, the file format of the target rich text can be a WPS format.

In an example with the intelligent terminal device being a mobile terminal device, particularly, a mobile terminal device with an Android system or an iOS system, the invoked rendering tool can be an existing rendering tool in the system, and correspondingly, the file format of the target rich text can be a file format renderable by the existing rendering tool in the operating system. For example, if the operating system includes a rendering tool that can render a Hyper Text Markup Language (HTML) file, the file format of the target rich text can be an HTML format.

It can be determined that in an implementation, the invoked rendering tool can be limited to an existing rendering tool in a system, and the file format of the target rich text can be a file format renderable by the existing rendering tool in the operating system. Therefore, rendering of a rich text can be transferred from a 3D engine layer to an API layer of a system. Because the system provides abundant APIs, for a rich text that is difficult to achieve an original nature or that is difficult to dynamically generate on a 3D model, desired data can be first rendered by using an API of the system, and then a rendering result can be rendered to a 3D model in the implementations of the present specification. As such, the 3D model and a native control of the system can be well-integrated, and the rich text can be displayed on the 3D model without increasing load of a 3D engine.

After the target rich text is obtained, the rendering tool corresponding to the file format of the target rich text can be invoked to render the target rich text, so as to obtain the result page. An objective of the implementation is to render the target rich text by using an existing rendering tool without increasing load of the 3D engine.

In an example with the target rich text being an HTML file, the rendering tool can be an API of WebView, and the result page can be a web page. WebView can be a webkit engine-based control that displays web pages. Therefore, the API of WebView in the system can be invoked to render the rich text in the HTML format to obtain the web page. As an example, the rich text in the HTML format can be rendered to a UI control. A rendering process can include parsing the HTML file, constructing a Document Object Model (DOM) tree, preparing a layout, drawing, etc. Specific details are the same as details of HTML file rendering in a related technology, which are omitted here for simplicity.

After the result page is obtained, the graphical programming interface can be invoked to display the result page in the to-be-displayed area of the 3D model by using the texture mapping method.

The graphical programming interface, which can also be referred to as an Open Graphics Library (OpenGL), is a cross-language, cross-platform application programming interface (API) used to render 2D and 3D vector graphics.

Texture mapping is a process of mapping a texture pixel in a texture space to a pixel in a screen space, which can be understood as applying an image to a surface of a three-dimensional object to enhance a sense of reality. The to-be-displayed area can be one or more faces of the 3D model, or can be a partial area of a certain face.

In the implementation, the result page is displayed in the to-be-displayed area of the 3D model by using the texture mapping method. As such, the 3D model and an existing control of the system can be well-integrated, without a need to extend a function of the 3D model, and the rich text can be displayed on the 3D model, thereby saving resources.

In an implementation, the result page can be converted into a picture. The graphical programming interface (OpenGL) can be invoked to obtain a texture of the to-be-displayed area of the 3D model, the picture can be drawn to the texture to obtain a texture image, and the texture image can be mapped to the to-be-displayed area of the 3D model.

In OpenGL, because texture coordinates determine which texture pixel in the texture image can be assigned with a vertex, the texture image can be mapped to the to-be-displayed area of the 3D model by specifying the texture coordinates, and the texture coordinates can be obtained based on the to-be-displayed area, so that the texture image can be mapped to the to-be-displayed area of the 3D model.

In an example, the steps of drawing using the texture can include texture mapping definition, texture control, texture mapping method description, texture coordinate definition, etc. A texture can be defined by using a continuous method or a discrete method. The continuous method defines a texture as a bivariate function, and the discrete method defines a texture in a two-dimensional array. The discrete method is the more commonly used texture definition method. The texture control deals with how to map a texture of a texture image to pixels on a screen, how to implement texture scaling and texture repetition through texture mapping, etc. Texture coordinates control how pixels in a texture image are mapped to an object. The texture coordinates can be 1, 2, 3, or 4-dimensional, and are generally represented by using homogeneous coordinates, that is, (s, t, r, q). It can be understood that the texture mapping method can further be the same as a texture mapping method in a related technology, no limitation is imposed here.

In the implementations of the present specification, 3D models can be widely applied to a variety of fields, for example, used to prepare accurate models of organs in the medical industry, applied to animated figures and objects and augmented reality movies in the movie industry, and used as resources in computer and electronic games in the electronic game industry.

In an optional implementation method, the 3D model is a virtual model in an AR scenario. The virtual model can include but is not limited to virtual models of buildings, plants, transportations, human beings, animals, creatures, machines, data, videos, texts, pictures, etc.

It can be determined that rich text rendering can be implemented in the AR scenario to enhance display diversity.

Various technical features in the previous implementation methods can be combined randomly, provided that a combination of the features has no conflict or contradiction, and details are omitted due to limited space of description. Therefore, any combination of the various technical features in the previous implementation methods also falls within the scope disclosed in the present specification.

The following uses one of the combinations as an example for description.

Figure 2:
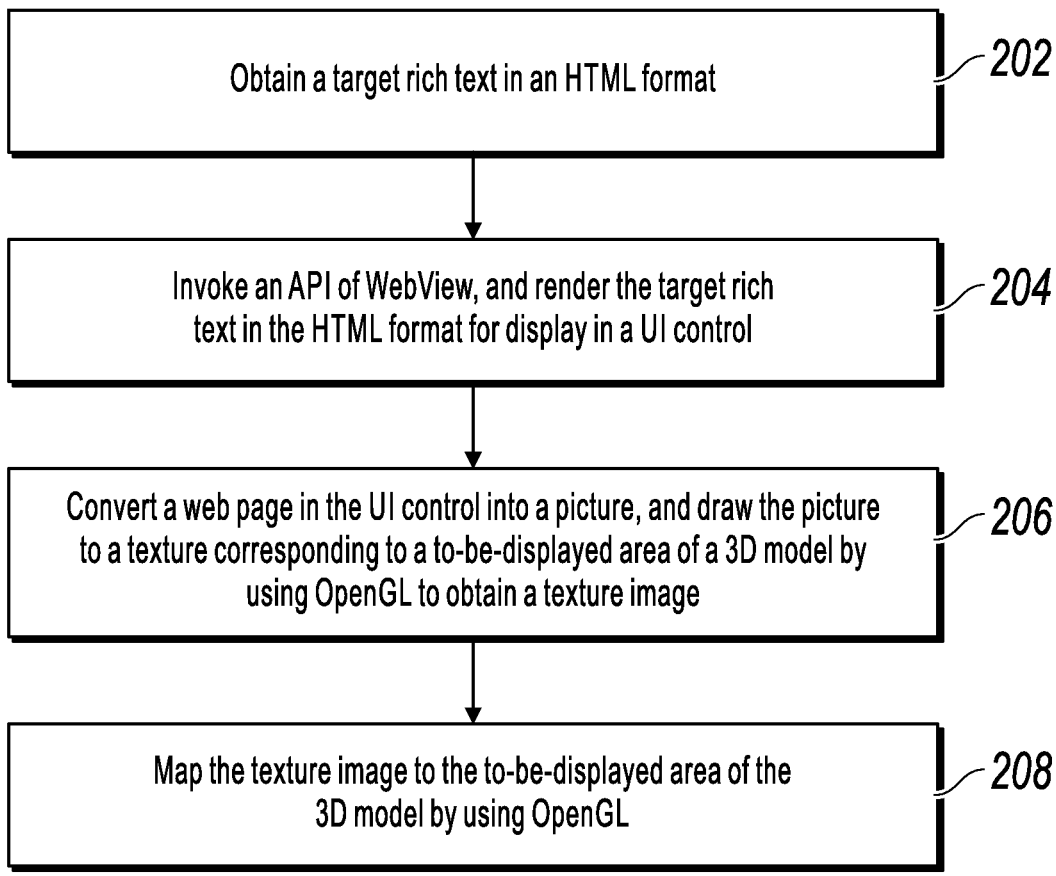
FIG. 2 is a flowchart illustrating another method for displaying a rich text on a 3D model, according to an example implementation of the present specification.

As shown in FIG. 2, FIG. 2 is a flowchart illustrating another method for displaying a rich text on a 3D model, according to an example implementation of the present specification. The method includes the following:

In step 202, a target rich text in an HTML format is obtained.

Because HTML is a language used for web pages, it contains abundant tags and can implement almost any style of typesetting. In addition, HTML enables preview directly on a browser, and is very convenient for editing. The target rich text in the HTML format is an HTML file. In the present implementation step, content can be read from the HTML file to a memory.

In step 204, an API of WebView is invoked, and the target rich text in the HTML format is rendered for display in a UI control.

The API of WebView can be a WebView API provided by an operating system such as an iOS system or an Android system, so that the rich text can be rendered by using an existing API in the system.

In step 206, a web page in the UI control is converted into a picture, and the picture is drawn to a texture corresponding to a to-be-displayed area of a 3D model by using OpenGL to obtain a texture image.

The texture of the to-be-displayed area of the 3D model can be obtained by using the API of WebView, and the image can be drawn to the texture to obtain the texture image.

In step 208, the texture image is mapped to the to-be-displayed area of the 3D model by using OpenGL.

There is a node in the 3D model that needs rendering of the target rich text, and the texture image can be mapped to the node, so as to render the rich text in the HTML format to the 3D model.

In the implementation, a standard HTML language is used as a rich text format, so that complex content can be rendered, and consistent effects can be maintained on multiple platforms. A picture and text combination, a table, and other effects that are very difficult to achieve in a 3D engine can be completed according to the implementation, so as to mitigate a high-cost problem caused by expanding the 3D engine.

Figure 3:
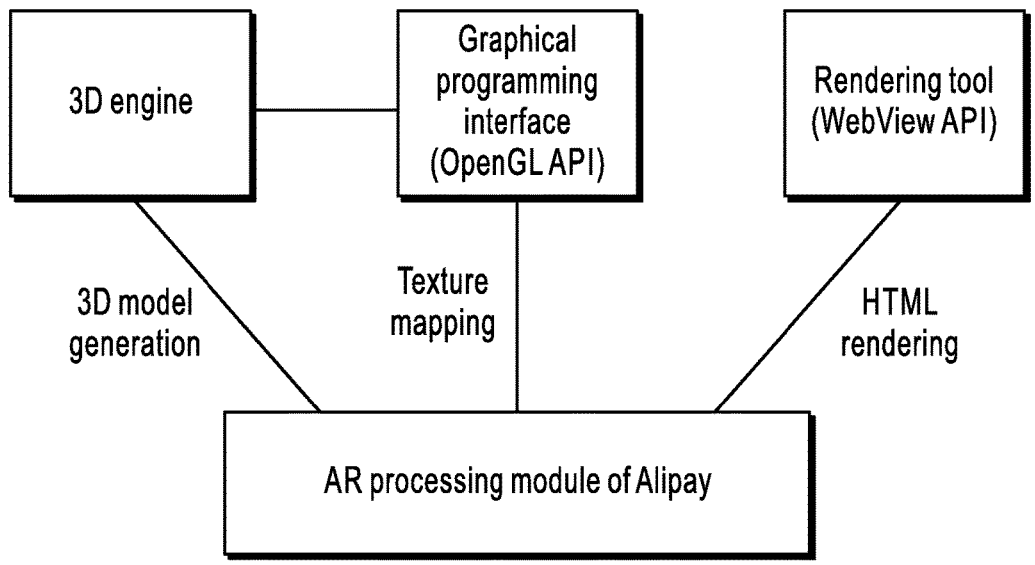
FIG. 3 is a diagram illustrating a framework for displaying a rich text on a 3D model, according to an example implementation of the present specification.

In the present specification, Alipay is used as an example to describe an architecture of the implementations of the present specification. As shown in FIG. 3, FIG. 3 is a diagram illustrating a framework for displaying a rich text on a 3D model, according to an example implementation of the present specification. An AR processing module of Alipay can execute the previous method for displaying a rich text on a 3D model. For example, a virtual model in an AR scenario can be generated by using a 3D engine, HTML can be rendered by using a WebView API, and texture mapping can be performed by using an OpenGL API, so as to render the rich text in a to-be-displayed area of the virtual model. HTML is used as a rich text format. Because both the WebView API and the OpenGL API are system APIs, a capability of rendering a web page by using a system API can be well-integrated with the 3D engine, so as to render a complex rich text in the 3D engine.

Corresponding to the previous implementations of the method for displaying a rich text on a 3D model, the present specification further provides implementations of an apparatus for displaying a rich text on a 3D model and an electronic device that applies the apparatus.

Figure 4:
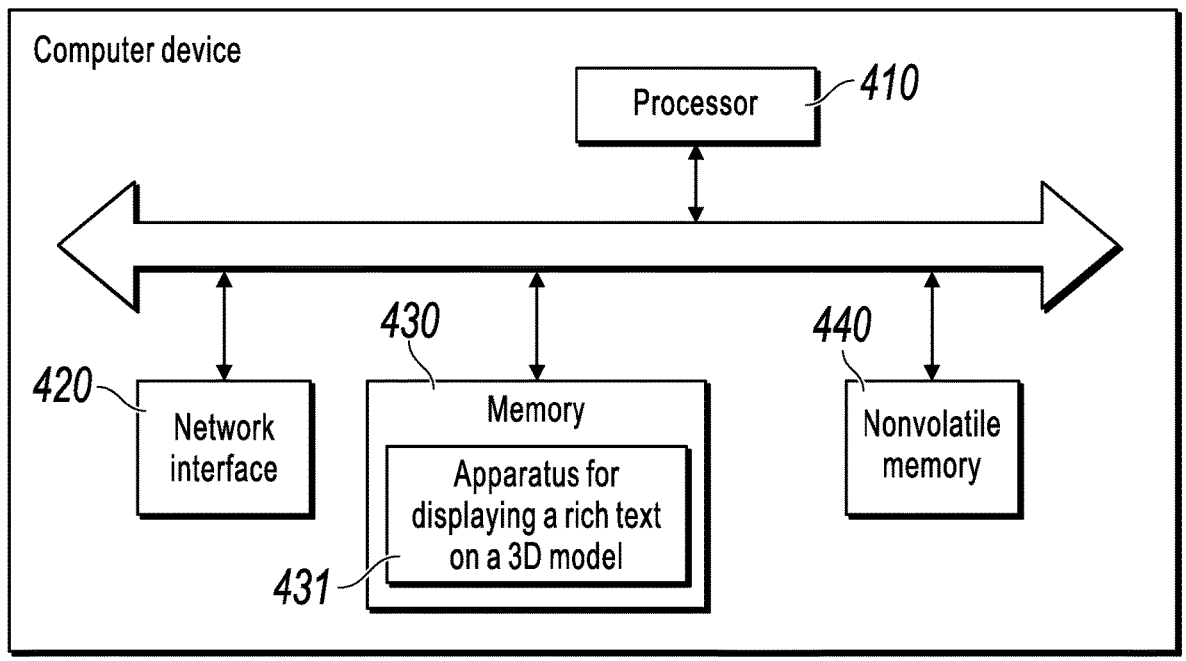
FIG. 4 is a hardware structural diagram illustrating a computer device housing an apparatus for displaying a rich text on a 3D model, according to an example implementation of the present specification.

The implementations of the apparatus for displaying a rich text on a 3D model in the present specification can be applied to the computer device. The apparatus implementations can be implemented by software, hardware, or a combination of hardware and software. Software implementation is used as an example. As a logical apparatus, the apparatus is formed by reading a corresponding computer program instruction in a nonvolatile memory to a memory by a processor of a computer device that houses the apparatus. In a hardware aspect, as shown in FIG. 4, FIG. 4 is a hardware structural diagram illustrating a computer device housing an apparatus for displaying a rich text on a 3D model in the present specification. In addition to a processor 410, a memory 430, a network interface 420, and a nonvolatile memory 440 shown in FIG. 4, a computer device housing an apparatus 431 in the implementations generally can further include other hardware based on an actual function of the device. Details are omitted here for simplicity.

Figure 5:
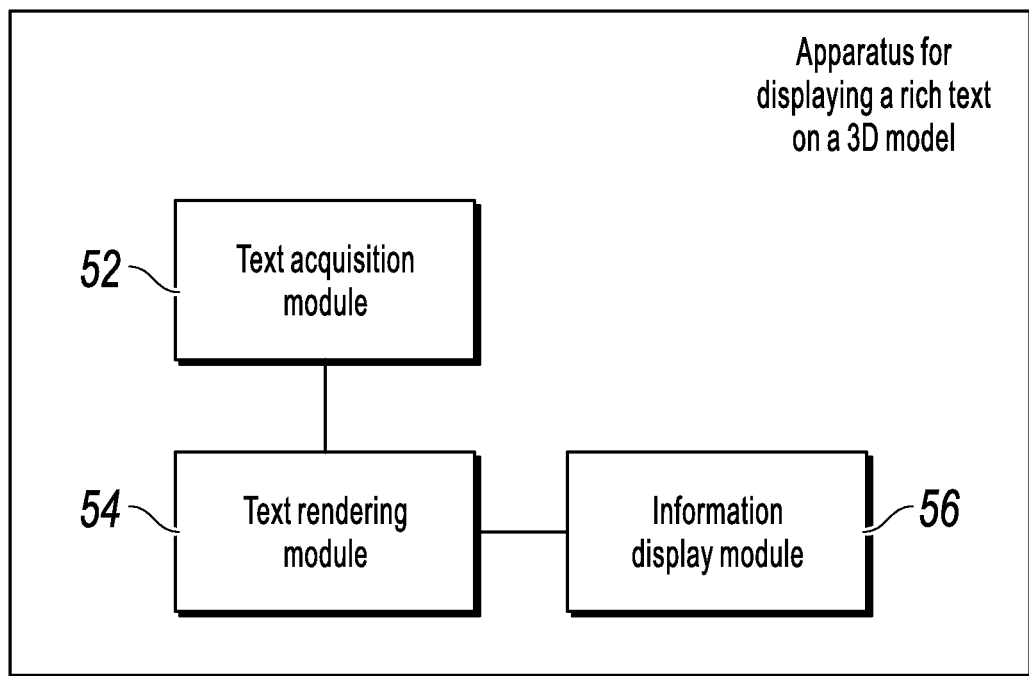
FIG. 5 is a block diagram illustrating an apparatus for displaying a rich text on a 3D model, according to an example implementation of the present specification.

As shown in FIG. 5, FIG. 5 is a block diagram illustrating an apparatus for displaying a rich text on a 3D model, according to an example implementation of the present specification. The apparatus includes the following: a text acquisition module 52, configured to obtain a target rich text; a text rendering module 54, configured to invoke a rendering tool corresponding to a file format of the target rich text, and render the target rich text to obtain a result page; and an information display module 56, configured to invoke a graphical programming interface to display the result page in a to-be-displayed area of a 3D model by using a texture mapping method.

Optionally, the information display module 56 is specifically configured to convert the result page into a picture; and invoke the graphical programming interface to obtain a texture of the to-be-displayed area of the 3D model, draw the picture to the texture to obtain a texture image, and map the texture image to the to-be-displayed area of the 3D model.

Optionally, the target rich text includes any one of the following: a pre-stored rich text used for display in the to-be-displayed area of the 3D model; a rich text obtained by filling in a predetermined rich text template based on user information, where the rich text template is a predetermined template related to the 3D model; and a rich text related to the 3D model and obtained based on a user configuration instruction.

Optionally, the target rich text is stored in a file format that can be processed by an existing rendering tool in an operating system.

Optionally, the file format of the rich text is HTML, the rendering tool is an API of WebView, and the result page is a web page.

Optionally, the 3D model is a virtual model in an AR scenario.

Because an apparatus implementation corresponds to a method implementation, for related parts, references can be made to related descriptions in the method implementation. The described apparatus implementation is merely an example. The modules described as separate parts can or does not have to be physically separate, and parts displayed as modules can or cannot be physical modules, can be located in one position, or can be distributed on a plurality of network modules. Some or all of the modules can be selected based on actual needs to achieve the objectives of the solutions of the present specification. A person of ordinary skill in the art can understand and implement the implementations of the present specification without creative efforts.

Correspondingly, an implementation of the present specification further provides a computer device, including a processor, and a memory configured to store an instruction executable by the processor. The processor is configured to obtain a target rich text; invoke a rendering tool corresponding to a file format of the target rich text, and render the target rich text to obtain a result page; and invoke a graphical programming interface to display the result page in a to-be-displayed area of a 3D model by using a texture mapping method.

The implementations in the present specification are described in a progressive way. For same or similar parts of the implementations, references can be made to the implementations mutually. Each implementation focuses on a difference from other implementations. Especially, a device implementation is basically similar to a method implementation, and therefore is described briefly; for related parts, reference can be made to partial descriptions in the method implementation.

A computer storage medium is provided, where the storage medium stores a program instruction, and the program instruction includes the following: obtaining a target rich text; invoking a rendering tool corresponding to a file format of the target rich text, and rendering the target rich text to obtain a result page; and invoking a graphical programming interface to display the result page in a to-be-displayed area of a 3D model by using a texture mapping method.

The implementations of the present specification can use a form of a computer program product that is implemented on one or more storage media (including but not limited to a disk memory, a CD-ROM, an optical memory, etc.) that include program code. The computer readable medium includes persistent, non-persistent, movable, and unmovable media that can store information by using any method or technology. The information can be a computer readable instruction, a data structure, a program module, or other data. Examples of the computer storage media include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be used to store information accessible by a computing device.

Other implementations of the present specification will readily occur to a person skilled in the art upon consideration of the present specification and practice of the specification as applied here. The present specification is intended to cover any variation, use, or adaptation of the present specification that conforms to general principles of the present specification and that include common general knowledge or a technical means in the art that is not claimed in the present specification. The specification and the implementations are merely considered as examples, and the actual scope and the spirit of the present specification are pointed out by the following claims.

It should be understood that the present specification is not limited to the precise structures that have been described above and shown in the drawings, and various modifications and changes can be made without departing from the scope of the present specification. The scope of the present specification is limited by the appended claims only.

The previous descriptions are merely preferred implementations of the present specification, but are not intended to limit the present specification. Any modification, equivalent replacement, or improvement made without departing from the spirit and principle of the present specification shall fall within the protection scope of the present specification.

What is claimed is:

1. A computer-implemented method for displaying rich text on 3D models, wherein the method comprises:
   providing a configuration interface usable by a user to configure a target rich text based on a first rich text template, wherein the first rich text template corresponds to a first 3D model, and wherein a second rich text template, different from the first rich text template, corresponds to a second 3D model;
   based on user configuration instructions provided in the configuration interface, obtaining an HTML file edited by the user;
   invoking an application programming interface;
   invoking a rendering tool of the application programming interface, the rendering tool corresponding to an HTML file format;
   rendering the HTML file using the rendering tool, to obtain a web page;
   invoking a graphical programming interface distinct from the application programming interface;
   generating the first 3D model using a 3D engine, the 3D engine being distinct from the application programming interface;
   converting the web page into a picture;
   obtaining a texture of an area of the first 3D model using the graphical programming interface;

drawing the picture to the texture using the graphical programming interface, to obtain a texture image; and texture mapping the texture image to the area of the first 3D model using the graphical programming interface.

2. The computer-implemented method of claim 1, wherein the application programming interface comprises a WebView application programming interface.

3. The computer-implemented method of claim 1, wherein the graphical programming interface comprises OpenGL.

4. The computer-implemented method of claim 1, wherein the first 3D model comprises a virtual model in an augmented reality application.

5. The computer-implemented method of claim 1, wherein the 3D engine is distinct from the graphical programming interface.

6. The computer-implemented method of claim 1, wherein a third rich text template, different from the first rich text template, corresponds to a second area of the first 3D model.

7. The computer-implemented method of claim 1, wherein rendering the HTML file comprises rendering the HTML file to a UI control.

8. A non-transitory, computer-readable medium storing one or more instructions that, when executed by a computer system, cause the computer system to perform operations for displaying rich text on 3D models, the operations comprising:

providing a configuration interface usable by a user to configure a target rich text based on a first rich text template, wherein the first rich text template corresponds to a first 3D model, and wherein a second rich text template, different from the first rich text template, corresponds to a second 3D model;

based on user configuration instructions provided in the configuration interface, obtaining an HTML file edited by the user;

invoking an application programming interface;

invoking a rendering tool of the application programming interface, the rendering tool corresponding to an HTML file format;

rendering the HTML file using the rendering tool, to obtain a web page;

invoking a graphical programming interface distinct from the application programming interface;

generating the first 3D model using a 3D engine, the 3D engine being distinct from the application programming interface;

converting the web page into a picture;

obtaining a texture of an area of the first 3D model using the graphical programming interface;

drawing the picture to the texture using the graphical programming interface, to obtain a texture image; and texture mapping the texture image to the area of the first 3D model using the graphical programming interface.

9. The non-transitory, computer-readable medium of claim 8, wherein the application programming interface comprises a WebView application programming interface.

10. The non-transitory, computer-readable medium of claim 8, wherein the graphical programming interface comprises OpenGL.

11. The non-transitory, computer-readable medium of claim 8, wherein the first 3D model comprises a virtual model in an augmented reality application.

12. The non-transitory, computer-readable medium of claim 8, wherein the 3D engine is distinct from the graphical programming interface.

13. A computer-implemented system, comprising:

one or more computers; and one or more computer memory devices interoperably coupled with the one or more computers and having tangible, non-transitory, machine-readable media storing one or more instructions that, when executed by the one or more computers, cause the one or more computers to perform one or more operations for displaying rich text on 3D models, the operations comprising:

providing a configuration interface usable by a user to configure a target rich text based on a first rich text template, wherein the first rich text template corresponds to a first 3D model, and wherein a second rich text template, different from the first rich text template, corresponds to a second 3D model;

based on user configuration instructions provided in the configuration interface, obtaining an HTML file edited by the user;

invoking an application programming interface;

invoking a rendering tool of the application programming interface, the rendering tool corresponding to an HTML file format;

rendering the HTML file using the rendering tool, to obtain a web page;

invoking a graphical programming interface distinct from the application programming interface;

generating the first 3D model using a 3D engine, the 3D engine being distinct from the application programming interface;

converting the web page into a picture;

obtaining a texture of an area of the first 3D model using the graphical programming interface;

drawing the picture to the texture using the graphical programming interface, to obtain a texture image; and texture mapping the texture image to the area of the first 3D model using the graphical programming interface.

14. The computer-implemented system of claim 13, wherein the application programming interface comprises a WebView application programming interface.

15. The computer-implemented system of claim 13, wherein the graphical programming interface comprises OpenGL.

16. The computer-implemented system of claim 13, wherein the first 3D model comprises a virtual model in an augmented reality application.

17. The computer-implemented system of claim 13, wherein the 3D engine is distinct from the graphical programming interface.

* * * * *